United States Patent
Yang et al.

(10) Patent No.: US 9,335,510 B2
(45) Date of Patent: May 10, 2016

(54) DISPLAY WITH ELECTROMECHANICAL MIRRORS FOR MINIMIZING DISPLAY BORDERS

(71) Applicant: Apple Inc., Cupertino, CA (US)

(72) Inventors: Tseng-Mau Yang, Cupertino, CA (US); Dale N. Memering, San Francisco, CA (US); Christopher D. Prest, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 365 days.

(21) Appl. No.: 13/631,125

(22) Filed: Sep. 28, 2012

(65) Prior Publication Data

US 2014/0092283 A1    Apr. 3, 2014

(51) Int. Cl.
*H04N 3/14* (2006.01)
*H04N 5/335* (2011.01)
*G02B 7/18* (2006.01)
*G02B 7/182* (2006.01)
*G02B 26/08* (2006.01)

(52) U.S. Cl.
CPC .............. *G02B 7/1805* (2013.01); *G02B 7/182* (2013.01); *G02B 26/0841* (2013.01)

(58) Field of Classification Search
CPC .. G02B 7/1805; G02B 7/182; G02B 26/0841; G02B 5/045; G02B 5/3016; G02B 27/1066
USPC .................................. 348/298; 359/851, 291
See application file for complete search history.

(56) References Cited

U.S. PATENT DOCUMENTS 6,028,690 A * 2/2000 Carter ................ G02B 26/0841
                                                          359/224.1
6,633,359 B1 * 10/2003 Zhang ............... G02F 1/136286
                                                             349/139

(Continued)

FOREIGN PATENT DOCUMENTS

CN      101593473         12/2009
CN      102854644         1/2013

*Primary Examiner* — Antoinette Spinks
(74) *Attorney, Agent, or Firm* — Treyz Law Group, P.C.; G. Victor Treyz; Joseph F. Guihan

(57) ABSTRACT

An electronic device may be provided with a display mounted in a housing. The display may have an array of display pixels that provide light to a user. The array of display pixels may form active display structures with a rectangular shape. The rectangular active display structures may be surrounded by an inactive border region. Reflector structures may be used to reflect light that is emitted from peripheral portions of the active display structures to a portion of the display overlapping the inactive border region, thereby providing the display with an effective active area that is larger than the area of the active display structures. The reflector structures may include rotatable reflectors. Control circuitry may use a rotatable positioner to rotate rotatable reflector structures in synchronization with controlling which pixel data is displayed by the display pixels in the peripheral portions of the active display structures.

17 Claims, 15 Drawing Sheets

(56) References Cited

U.S. PATENT DOCUMENTS

| | | | |
|---|---|---|---|
| 7,580,023 B2 * | 8/2009 | Pugh | G02F 1/133514 345/102 |
| 7,719,500 B2 | 5/2010 | Chui | |
| 7,746,529 B2 | 6/2010 | Hagood et al. | |
| 2003/0206254 A1 | 11/2003 | Liu et al. | |
| 2003/0218794 A1 * | 11/2003 | Takeda et al. | 359/292 |
| 2007/0229422 A1 * | 10/2007 | Hung | G09G 5/008 345/88 |
| 2008/0247128 A1 | 10/2008 | Khoo | |
| 2009/0168028 A1 | 7/2009 | Magarill | |
| 2012/0242638 A1 * | 9/2012 | Zhong et al. | 345/211 |
| 2012/0249519 A1 | 10/2012 | Cummings | |
| 2013/0235560 A1 * | 9/2013 | Etienne et al. | 362/97.1 |
| 2013/0271957 A1 * | 10/2013 | Etienne et al. | 362/97.1 |

* cited by examiner

DISPLAY WITH ELECTROMECHANICAL MIRRORS FOR MINIMIZING DISPLAY BORDERS

BACKGROUND

This relates generally to electronic devices, and more particularly, to electronic devices with displays.

Electronic devices often include displays. For example, cellular telephones and portable computers often include displays for presenting information to a user. An electronic device may have a housing such as a housing formed from plastic or metal. Components for the electronic device such as display components may be mounted in the housing.

It can be challenging to incorporate a display into the housing of an electronic device. Size and weight are often important considerations in designing electronic devices. If care is not taken, displays may be bulky or may be surrounded by overly large borders. The housing of an electronic device can be adjusted to accommodate a bulky display with large borders, but this can lead to undesirable enlargement of the size and weight of the housing and unappealing device aesthetics.

It would therefore be desirable to be able to provide improved displays for electronic devices.

SUMMARY

An electronic device may be provided with a display mounted in a housing. The display may have an array of display pixels that provide light to a user. The array of display pixels may form an active display structure with a rectangular shape. The rectangular active display structure may be surrounded by an inactive border region. Reflector structures may be provided around the periphery of the display structure. The reflector structures may be used to reflect light that is emitted from peripheral portions of the active display structure to a portion of the display overlapping the inactive border region, thereby providing the display with an effective area that is larger than the area of the active display structures.

The active display structures may have portions such as bent edge portions that emit light that is reflected by a fixed reflector or other reflector structures. The reflector structures may, for example, include a rotatable reflector. Control circuitry may use a rotatable positioner to rotate the rotatable reflector while simultaneously with controlling which pixel data is displayed by the display pixels in the peripheral portions of the active display structure. This allows pixel data to be distributed across the portion of the display that overlaps the inactive border region.

Display pixels may, if desired, be provided with enhanced brightness in the peripheral portion of active display structures to compensate for the use of the rotatable reflector to distribute display pixel light across multiple display locations. Curved or other non-planar surfaces may be used in the reflector structures.

An imaging system may use rotatable reflector structures to enhance the area of an image sensor used to capture digital image data.

Further features of the invention, its nature and various advantages will be more apparent from the accompanying drawings and the following detailed description of the preferred embodiments.

DETAILED DESCRIPTION

Electronic devices may include displays. The displays may be used to display images to a user. Illustrative electronic devices that may be provided with displays are shown in FIGS. 1, 2, and 3.

Figure 1:
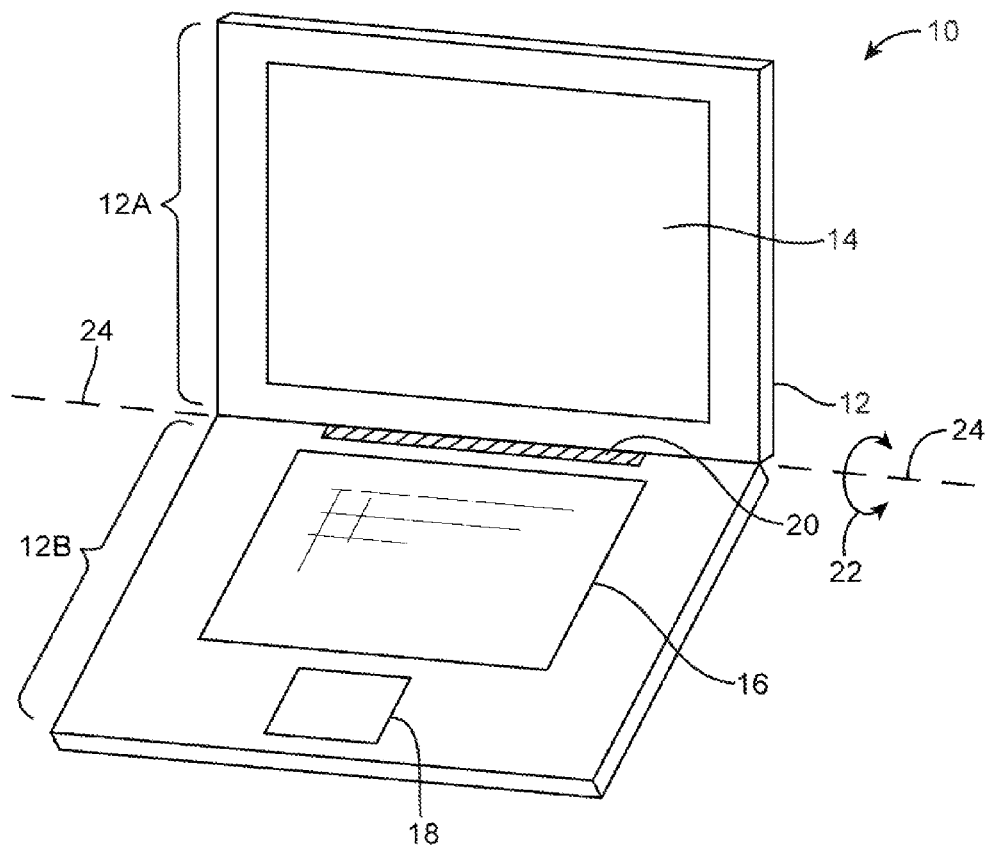
FIG. 1 is a perspective view of an illustrative electronic device such as a laptop computer with a display in accordance with an embodiment of the present invention.

FIG. 1 shows how electronic device 10 may have the shape of a laptop computer having upper housing 12A and lower housing 12B with components such as keyboard 16 and touchpad 18. Device 10 may have hinge structures 20 that allow upper housing 12A to rotate in directions 22 about rotational axis 24 relative to lower housing 12B. Display 14 may be mounted in upper housing 12A. Upper housing 12A, which may sometimes referred to as a display housing or lid, may be placed in a closed position by rotating upper housing 12A towards lower housing 12B about rotational axis 24.

Figure 2:
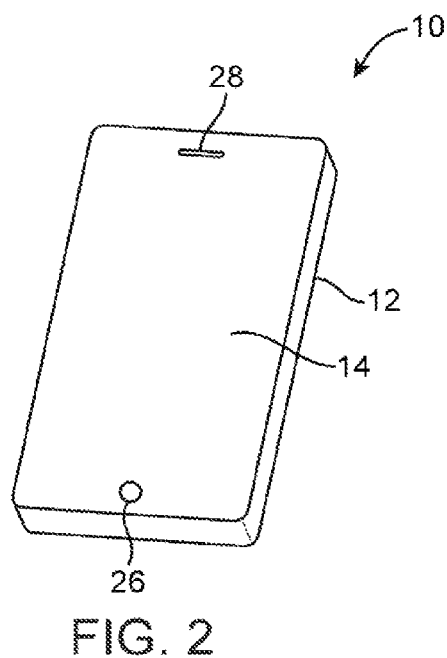
FIG. 2 is a perspective view of an illustrative electronic device such as a handheld electronic device with a display in accordance with an embodiment of the present invention.

FIG. 2 shows how electronic device 10 may be a handheld device such as a cellular telephone, music player, gaming device, navigation unit, or other compact device. In this type of configuration for device 10, housing 12 may have opposing front and rear surfaces. Display 14 may be mounted on a front face of housing 12. Display 14 may, if desired, have a display cover layer or other exterior layer that includes openings for components such as button 26. Openings may also be formed in a display cover layer or other display layer to accommodate a speaker port (see, e.g., speaker port 28 of FIG. 2).

Figure 3:
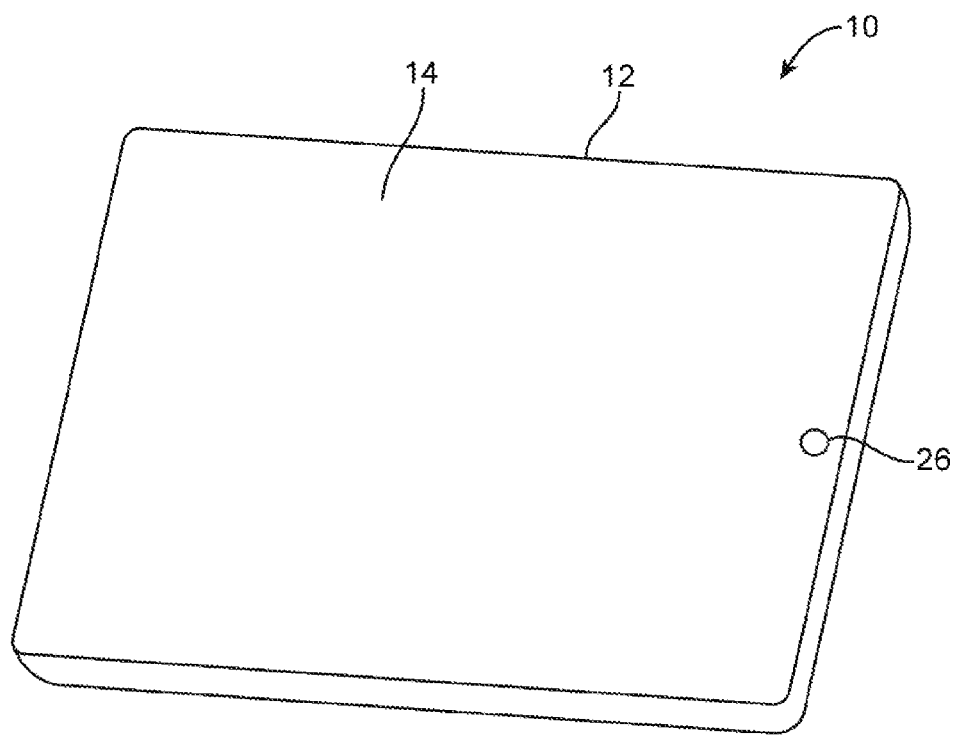
FIG. 3 is a perspective view of an illustrative electronic device such as a tablet computer with a display in accordance with an embodiment of the present invention.

FIG. 3 shows how electronic device 10 may be a tablet computer. In electronic device 10 of FIG. 3, housing 12 may have opposing planar front and rear surfaces. Display 14 may be mounted on the front surface of housing 12. As shown in FIG. 3, display 14 may have a cover layer or other external layer with an opening to accommodate button 26 (as an example).

The illustrative configurations for device 10 that are shown in FIGS. 1, 2, and 3 are merely illustrative. In general, electronic device 10 may be a laptop computer, a computer monitor containing an embedded computer, a tablet computer, a cellular telephone, a media player, or other handheld or portable electronic device, a smaller device such as a wrist-watch device, a pendant device, a headphone or earpiece device, or other wearable or miniature device, a television, a computer display that does not contain an embedded computer, a gaming device, a navigation device, an embedded system such as a system in which electronic equipment with a display is mounted in a kiosk or automobile, equipment that implements the functionality of two or more of these devices, or other electronic equipment.

Housing 12 of device 10, which is sometimes referred to as a case, may be formed of materials such as plastic, glass, ceramics, carbon-fiber composites and other fiber-based composites, metal (e.g., machined aluminum, stainless steel, or other metals), other materials, or a combination of these materials. Device 10 may be formed using a unibody construction in which most or all of housing 12 is formed from a single structural element (e.g., a piece of machined metal or a piece of molded plastic) or may be formed from multiple housing structures (e.g., outer housing structures that have been mounted to internal frame elements or other internal housing structures).

Display 14 may be a touch sensitive display that includes a touch sensor or may be insensitive to touch. Touch sensors for display 14 may be formed from an array of capacitive touch sensor electrodes, a resistive touch array, touch sensor structures based on acoustic touch, optical touch, or force-based touch technologies, or other suitable touch sensor components.

Displays for device 10 may, in general, include image pixels formed from light-emitting diodes (LEDs), organic LEDs (OLEDs), plasma cells, electrowetting pixels, electrophoretic pixels, liquid crystal display (LCD) components, or other suitable image pixel structures. In some situations, it may be desirable to use LCD components to form display 14, so configurations for display 14 in which display 14 is a liquid crystal display are sometimes described herein as an example. It may also be desirable to provide displays such as display 14 with backlight structures, so configurations for display 14 that include a backlight unit may sometimes be described herein as an example. Other types of display technology may be used in device 10 if desired. The use of liquid crystal display structures and backlight structures in device 10 is merely illustrative.

A display cover layer may cover the surface of display 14 or a display layer such as a color filter layer or other portion of a display may be used as the outermost (or nearly outermost) layer in display 14. A display cover layer or other outer display layer may be formed from a transparent glass sheet, a clear plastic layer, or other transparent structures.

Touch sensor components such as an array of capacitive touch sensor electrodes formed from transparent materials such as indium tin oxide may be formed on the underside of a display cover layer, may be formed on a separate display layer such as a glass or polymer touch sensor substrate, or may be integrated into other display layers (e.g., substrate layers such as a thin-film transistor layer).

Figure 4:
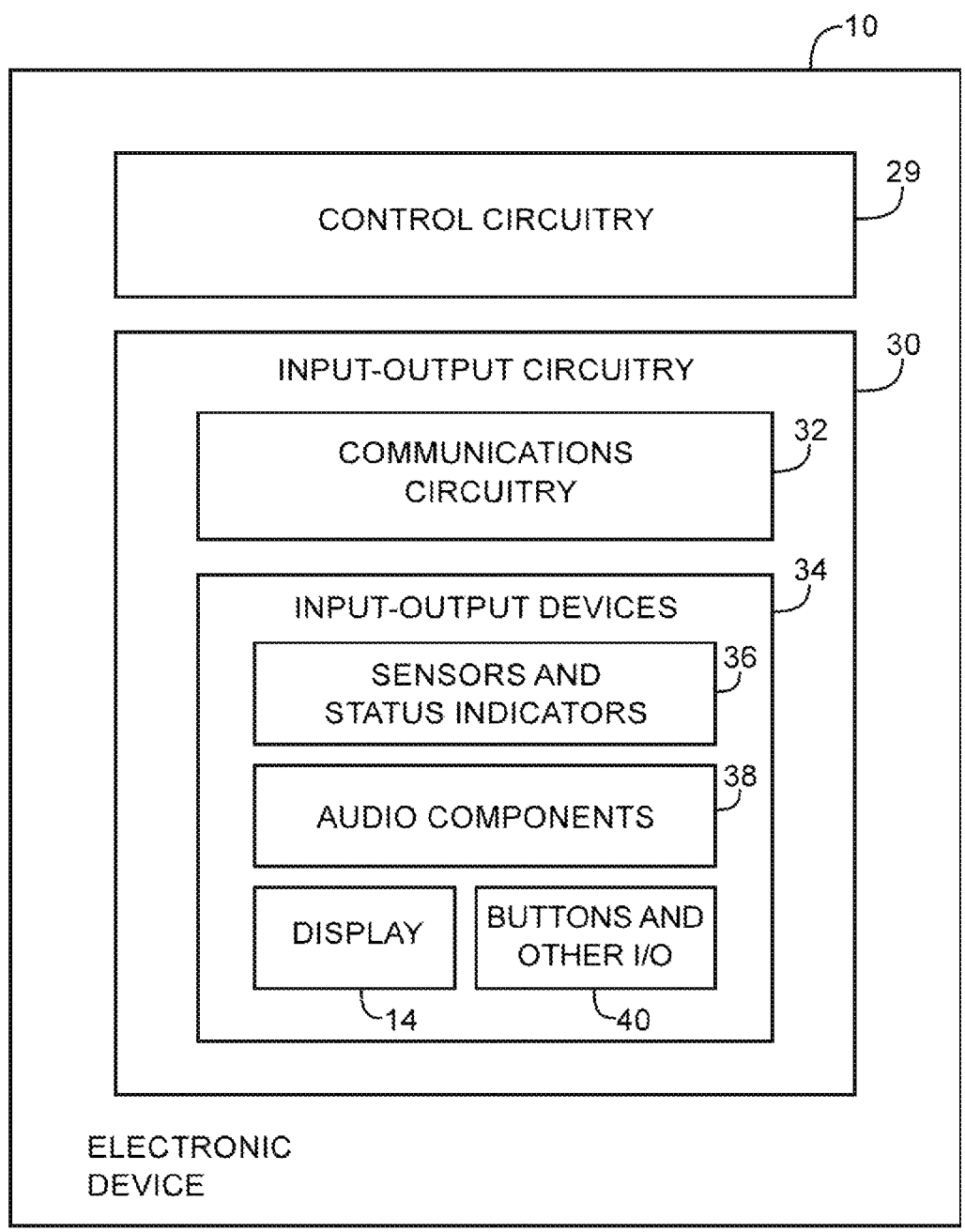
FIG. 4 is a schematic diagram of an illustrative electronic device with a display in accordance with an embodiment of the present invention.

A schematic diagram of an illustrative configuration that may be used for electronic device 10 is shown in FIG. 4. As shown in FIG. 4, electronic device 10 may include control circuitry 29. Control circuitry 29 may include storage and processing circuitry for controlling the operation of device 10. Control circuitry 29 may, for example, include storage such as hard disk drive storage, nonvolatile memory (e.g., flash memory or other electrically-programmable-read-only memory configured to form a solid state drive), volatile memory (e.g., static or dynamic random-access-memory), etc. Control circuitry 29 may include processing circuitry based on one or more microprocessors, microcontrollers, digital signal processors, baseband processors, power management units, audio codec chips, application specific integrated circuits, etc.

Control circuitry 29 may be used to run software on device 10, such as operating system software and application software. Using this software, control circuitry 29 may present information to a user of electronic device 10 on display 14. Display 14 may contain an array of display pixels (e.g., liquid crystal display pixels) that are organized in rows and columns. Control circuitry 29 may be used to display content for a user of device 10 on the array of display pixels in display 14.

Control circuitry 29 may include display driver circuitry and other circuitry for controlling the rate at which display pixels are refreshed and for controlling which pixel data is displayed by each display pixel. Display driver circuitry may be formed using thin-film-transistor circuitry on display 14 and/or integrated circuits mounted on a layer in display 14 or on a printed circuit. In addition to controlling the display of pixel data using the display pixels of display 14, control circuitry 29 may perform control operations within device 10 such as controlling the positions of movable mirrors such as electromechanical mirrors and other controllable electronic components. Control circuitry 29 may, for example, issue control commands that direct a movable mirror to move to a desired position. Mirror adjustments such as these may be synchronized with display control operations (e.g., to ensure that electromechanical mirrors are positioned as desired in synchronization with the operation of display pixels in display 14).

Input-output circuitry 30 may be used to allow data to be supplied to device 10 and to allow data to be provided from device 10 to external devices. Input-output circuitry 30 may include communications circuitry 32. Communications circuitry 32 may include wired communications circuitry for supporting communications using data ports in device 10. Communications circuitry 32 may also include wireless communications circuits (e.g., circuitry for transmitting and receiving wireless radio-frequency signals using antennas).

Input-output circuitry 30 may also include input-output devices 34. A user can control the operation of device 10 by supplying commands through input-output devices 34 and may receive status information and other output from device 10 using the output resources of input-output devices 34.

Input-output devices 34 may include sensors and status indicators 36 such as an ambient light sensor, a proximity sensor, a temperature sensor, a pressure sensor, a magnetic sensor, an accelerometer, and light-emitting diodes and other components for gathering information about the environment in which device 10 is operating and providing information to a user of device 10 about the status of device 10.

Audio components 38 may include speakers and tone generators for presenting sound to a user of device 10 and microphones for gathering user audio input.

Display 14 (e.g., the array of display pixels in display 14) may be used to present images for a user such as text, video, and still images. Sensors 36 may include a touch sensor array that is formed as one of the layers in display 14.

User input may be gathered using buttons and other input-output components 40 such as touch pad sensors, buttons, joysticks, click wheels, scrolling wheels, touch sensors such as sensors 36 in display 14, key pads, keyboards, vibrators, cameras, and other input-output components.

Figure 5:
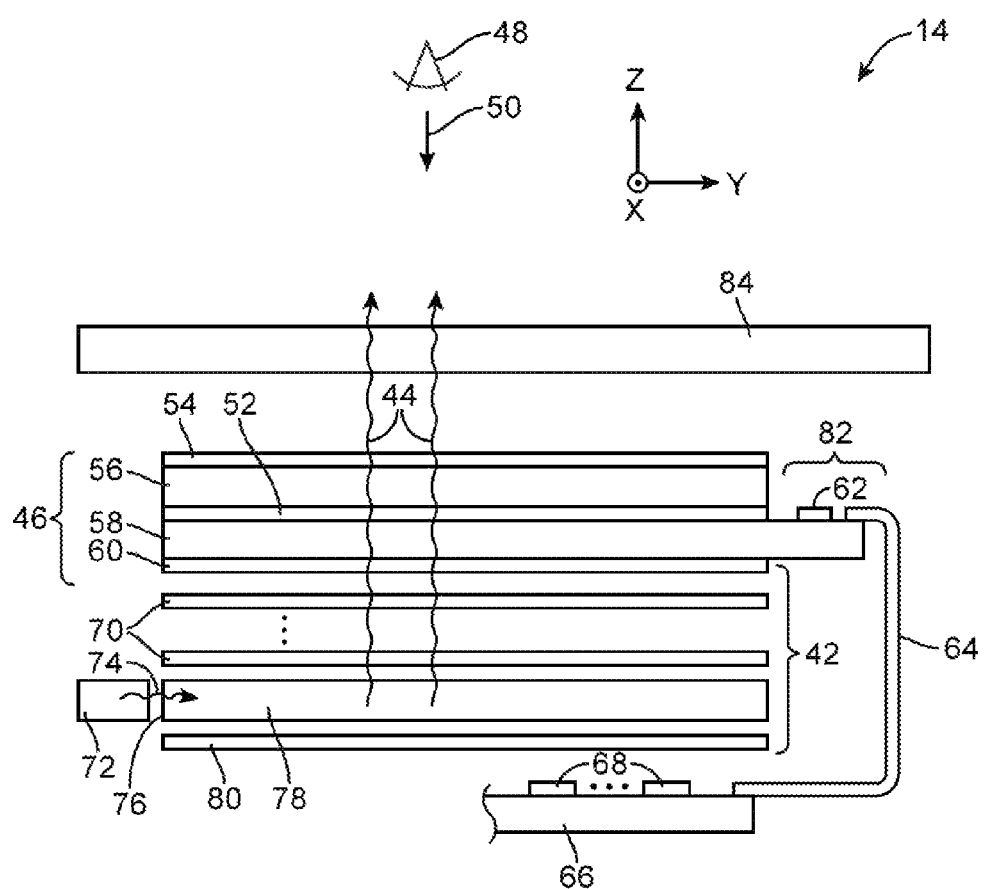
FIG. 5 is a cross-sectional side view of an illustrative display in accordance with an embodiment of the present invention.

A cross-sectional side view of an illustrative configuration that may be used for display 14 of device 10 (e.g., for display 14 of the devices of FIG. 1, FIG. 2, or FIG. 3 or other suitable electronic devices) is shown in FIG. 5. As shown in FIG. 5, display 14 may include backlight structures such as backlight unit 42 for producing backlight 44. During operation, backlight 44 travels outwards (vertically upwards in dimension Z in the orientation of FIG. 5) and passes through display pixel structures in display layers 46. This illuminates any images that are being produced by the display pixels for viewing by a user. For example, backlight 44 may illuminate images on display layers 46 that are being viewed by viewer 48 in direction 50.

Display 14 may, if desired, have one or more optical structures that are located above display layers 46. For example, display 14 may have a display cover layer such as display cover layer 84. Display cover layer 84 may be formed from a layer of clear glass, a transparent sheet of plastic, or other transparent structure. Display cover layer 84 may be mounted in housing 12 (e.g., using housing sidewalls). During operation, light 44 may pass through the array of display pixels formed from display layers 46 and display cover layer 84 for viewing by user 48.

Display layers 46 may be mounted in chassis structures such as a plastic chassis structure and/or a metal chassis structure to form a display module for mounting in housing 12 or display layers 46 may be mounted directly in housing 12 (e.g., by stacking display layers 46 into a recessed portion in housing 12). Display layers 46 may form a liquid crystal display or may be used in forming displays of other types. Display layers 46 may sometimes be referred to as a display module, a display, or an array of display pixels. The light (light 44) that passes through the array of display pixels is used in displaying content on display 14 for user 48.

In a configuration in which display layers 46 are used in forming a liquid crystal display, display layers 46 may include a liquid crystal layer such a liquid crystal layer 52. Liquid crystal layer 52 may be sandwiched between display layers such as display layers 58 and 56. Layers 56 and 58 may be interposed between lower polarizer layer 60 and upper polarizer layer 54.

Layers 58 and 56 may be formed from transparent substrate layers such as clear layers of glass or plastic. Layers 56 and 58 may be layers such as a thin-film transistor layer and/or a color filter layer. Conductive traces, color filter elements, transistors, and other circuits and structures may be formed on the substrates of layers 58 and 56 (e.g., to form a thin-film transistor layer and/or a color filter layer). Touch sensor electrodes may also be incorporated into layers such as layers 58 and 56 and/or touch sensor electrodes may be formed on other substrates.

With one illustrative configuration, layer 58 may be a thin-film transistor layer that includes an array of thin-film transistors and associated electrodes (display pixel electrodes) for applying electric fields to liquid crystal layer 52 and thereby displaying images on display 14. Layer 56 may be a color filter layer that includes an array of color filter elements for providing display 14 with the ability to display color images. If desired, layer 58 may be a color filter layer and layer 56 may be a thin-film transistor layer.

During operation of display 14 in device 10, control circuitry 29 (e.g., one or more integrated circuits such as components 68 on printed circuit 66 of FIG. 5) may be used to generate information to be displayed on display 14 (e.g., display data). The information to be displayed may be conveyed from circuitry 68 to display control circuitry such as display driver integrated circuit 62 using a signal path such as a signal path formed from conductive metal traces in flexible printed circuit 64 (as an example).

Display driver integrated circuit 62 may be mounted on thin-film-transistor layer driver ledge 82 or elsewhere in device 10. During operation of display 14, display driver circuitry 62 and/or other display control circuitry such as gate driver circuitry formed on substrate 58 or coupled to substrate 58 may be used in controlling the array of display pixels in layers 46 (e.g., using a grid of vertical data lines and horizontal gate lines).

A flexible printed circuit cable such as flexible printed circuit 64 may be used in routing signals between printed circuit 66 and thin-film-transistor layer 58. If desired, display driver integrated circuit 62 may be mounted on printed circuit 66 or flexible printed circuit 64. Printed circuit 66 may be formed from a rigid printed circuit board (e.g., a layer of fiberglass-filled epoxy) or a flexible printed circuit (e.g., a flexible sheet of polyimide or other flexible polymer layer).

Backlight structures 42 may include a light guide plate such as light guide plate 78. Light guide plate 78 may be formed from a transparent material such as clear glass or plastic. During operation of backlight structures 42, a light source such as light source 72 may generate light 74. Light source 72 may be, for example, an array of light-emitting diodes.

Light 74 from light source 72 may be coupled into edge surface 76 of light guide plate 78 and may be distributed in dimensions X and Y throughout light guide plate 78 due to the principal of total internal reflection. Light guide plate 78 may include light-scattering features such as pits or bumps. The light-scattering features may be located on an upper surface and/or on an opposing lower surface of light guide plate 78.

Light 74 that scatters upwards in direction Z from light guide plate 78 may serve as backlight 44 for display 14. Light 74 that scatters downwards may be reflected back in the upwards direction by reflector 80. Reflector 80 may be formed from a reflective material such as a layer of white plastic or other shiny materials.

To enhance backlight performance for backlight structures 42, backlight structures 42 may include optical films 70. Optical films 70 may include diffuser layers for helping to homogenize backlight 44 and thereby reduce hotspots, compensation films for enhancing off-axis viewing, and brightness enhancement films (also sometimes referred to as turning films) for collimating backlight 44. Optical films 70 may overlap the other structures in backlight unit 42 such as light guide plate 78 and reflector 80. For example, if light guide plate 78 has a rectangular footprint in the X-Y plane of FIG. 5, optical films 70 and reflector 80 may have a matching rectangular footprint. Display layers 46 and the other display structures of FIG. 5 typically have rectangular shapes with four peripheral edges, but display configurations with other shapes may be used in forming display 14 if desired.

Figure 6:
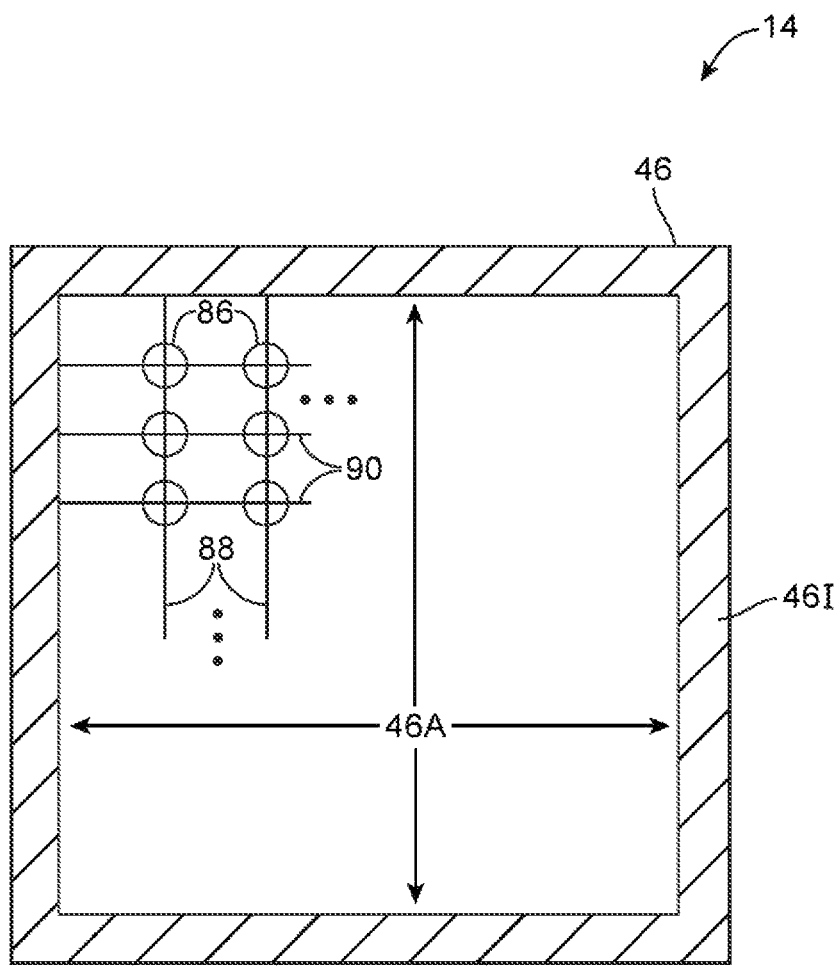
FIG. 6 is a top view of illustrative display layers in a display having an active region with an array of display pixels and an inactive border region in accordance with an embodiment of the present invention.

As shown in FIG. 6, display structures 46 of display 14 may include a plurality of display pixels 86. Display pixels 86 may be organized in rows and columns. Display control circuitry may be used in controlling the operation of display pixels 86 using signal lines such as data lines 88 and gate lines 90. In liquid crystal displays, display pixels 86 may each contain an electrode for applying an electric field to an associated portion of liquid crystal layer 52 (FIG. 5) and a thin-film (amorphous silicon or polysilicon) transistor for controlling the magnitude of the signal applied to the electrode and therefore the magnitude of the electric field. In other types of displays, display pixels 86 may be formed from other types of structures (e.g., organic light-emitting diodes, etc.).

Lines 90 may be coupled to the gates of the thin-film transistors and may sometimes be referred to as gate lines. Lines 88 may be coupled to the sources of the thin-film transistors and may sometimes be referred to as source lines or data lines. Gate driver circuitry (e.g., thin-film transistor gate driver circuitry) may be coupled to gate lines 90. Display driver circuitry that produces data signals for lines 88 (e.g., a display driver integrated circuit) may be coupled to data lines 88.

Gate driver circuitry, one or more display driver integrated circuits, traces for distributing gate and data signals and other display control signals, and other display control circuitry may be formed in inactive region 46I of display 14 and display structures 46. As an example, a display driver integrated circuit may be mounted along the upper segment of inactive region 46I, whereas gate driver thin-film circuitry may be formed along the left and right segments of inactive region 46I. During operation of display 14, display pixels 86 may display images for a user, so the portion of display structures 46 containing display pixels 86 may sometimes be referred to as active display structures or the active area of display 14. The metal traces and other display control circuit structures in inactive region 46I do not display any images, so this portion of structures 46 may sometimes be referred to as inactive display structures.

Inactive region 46I may form a border that surrounds some or all of active area 46A. For example, inactive region 46I may have a rectangular ring shape of the type shown in FIG. 6 having opposing upper and lower border segments and left and right border segments.

To provide display 14 with a borderless appearance, display 14 may be provided with reflective structures that distribute light from peripheral display pixels 86 near the edge of active area 46A into a portion of the display overlapping inactive area 46I. In this way, image content can be displayed over inactive area 46I, effectively increasing the lateral dimensions of display 14 sufficiently to eliminate inactive area 46I from view by a user.

The reflective structures that are used for distributing edge light in display 14 may be formed from stationary (fixed) mirrors, stationary reflecting prisms, movable reflective structures such as movable mirrors or prisms, or other reflective structures. As an example, a movable mirror may be implemented using microelectromechanical systems (MEMs) mirror structures (sometimes referred to as electromechanical mirrors). If desired, other types of adjustable reflective structures may be used in distributing light near the edge of display 14 to minimize visible borders. Configurations for display 14 in which reflective structures based on electromechanical mirrors are used in distributing light near the edge of display 14 may sometimes be described herein as an example.

Figure 7:
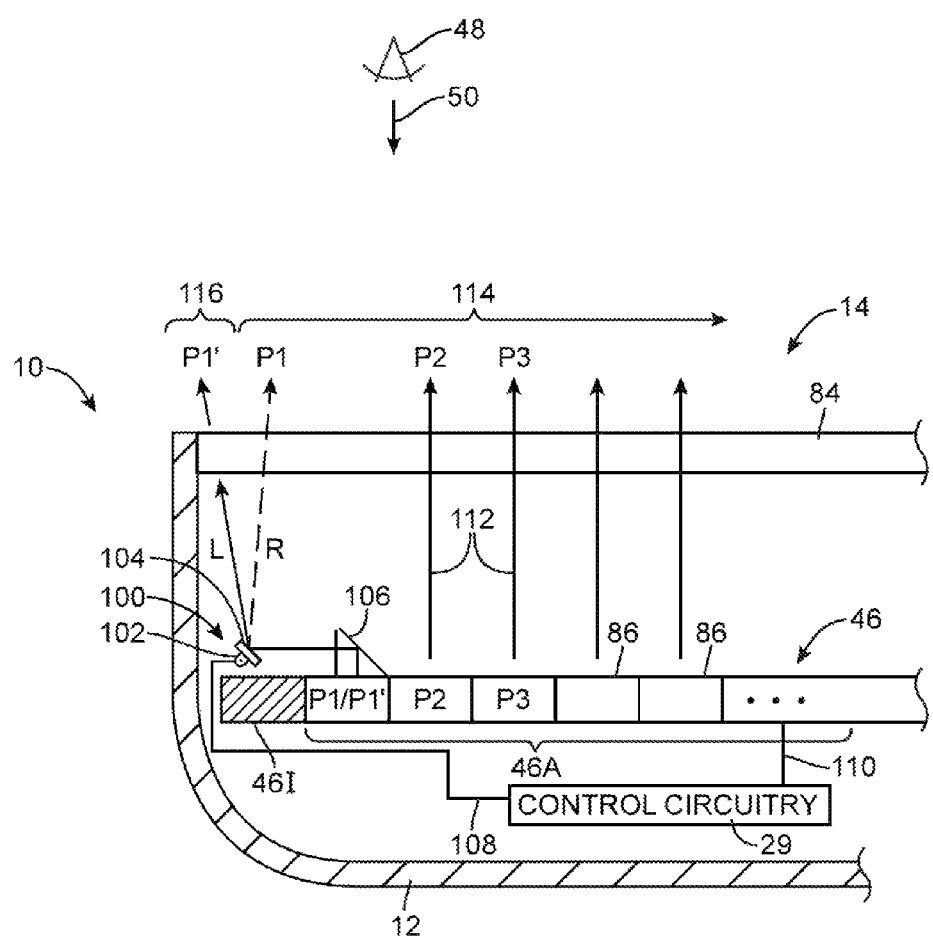
FIG. 7 is a cross-sectional side view of an illustrative electronic device with an electromechanical mirror to distribute light from pixels in the edge of a display to minimize display borders in accordance with an embodiment of the present invention.

FIG. 7 is a cross-sectional side view of device 10 in a configuration in which adjustable reflective structures such as electromechanical mirror structures are being used to redistribute light from display pixels near the edge of display 14. As shown in FIG. 7, display 14 may include a display cover layer such as display cover layer 84. Display cover layer 84 may be mounted in housing 12 of device 10 so as to cover and protect display structures 46.

Control circuitry 29 can control which content is displayed on display pixels 86 of display structures 46 at a given time. Control circuitry 29 may, for example, supply display pixel data and control signals to display pixels 86 using signal paths such as signal path 110. Synchronously, control circuitry 29 may supply control signals on path 108 to adjust electromechanical mirror structures 100. Mirror structures 100 may include one or more mirrors arranged around the periphery of display 14. Mirrors such as illustrative electromechanical mirror 100 of FIG. 7 may, for example, be formed in linear arrays along the left and right borders of display 14 (and, if desired, along the upper and lower borders of display 14 in addition to along the left and right borders of display 14).

Electromechanical mirror structures 100 may include reflective structures such as mirror structures or prism structures. Mirror structures 100 may, for example, include a rotatable mirror such as mirror 104. Mirror 104 may be mounted on an adjustable support such as rotatable actuator 102. Rotatable actuator 102 may be a yolk that is adjusted by application of a voltage control signal, part of a microelectromechanical systems structure such as a diving board structure on a semiconductor substrate, a solenoid-based structure, a stepper motor structure, a piezoelectric actuator structure, or other controllable positioner. By applying control signals to positioner 102 over path 108 from control circuitry 29, control circuitry 29 can be used to control the rotation of positioner 102 to control the direction in which mirror 104 reflects light from display structures 46 in real time.

Display structures 46 may include active area structures 46A such as display pixels 86 and inactive area structures 46I. Structures 46I do not produce light for displaying content and therefore are associated with an inactive border region around display 14. Using electromechanical mirror structures 100, pixel light from some of the display pixels near the edge of display structures 46 (e.g., peripheral display pixels in a rectangular ring shaped peripheral portion of display structures 46) can be distributed over inactive region 46I, thereby providing display 14 with a borderless appearance to a viewer such as viewer 48 who is viewing device 10 in direction 50.

As shown in FIG. 7, display pixels 86 may display pixel content such as pixel data P1, P2, and P3. The light from some of the display pixels in display structures 46 such as the light associated with pixel data P2 and P3 of display pixels 86 in the example of FIG. 7 travels vertically to viewer 48 unimpeded, as indicated by light ray lines 112. Display pixels at the edge of active area 46A such as the display pixels associated with pixel data P1/P1' of FIG. 7 produce light that is distributed across pixel locations overlapping inactive border region 46I.

Control circuitry 29 can alter the pixel data that is being presented by the P1/P1' display pixel while synchronously adjusting the position of mirror 104 in adjustable electromechanical mirror structures 100. Light from display pixel P1/P1' may be reflected onto mirror 104 using reflective structures 106 such as a mirror, prism, or other reflector (e.g., a stationary reflector that is coupled to the display pixel array or other support). By alternating the state of mirror 100 while controlling the pixel data that is displayed by display pixel P1/P1', control circuitry 29 can distribute display light over inactive border region 46I, so that display 14 appears borderless.

In the configuration of FIG. 7, for example, when control circuitry 29 is directing display pixel P1/P1' to display pixel data P1', mirror 100 may be placed in a state in which light from reflector 106 is reflected along path L, whereas when control circuitry 29 is directing display pixel P1/P1' to display pixel data P1, mirror 100 may be placed in a state in which light from reflector 106 is reflected along path R. In this way, viewer 49 may observe pixel data P1, P2, P3, . . . in region 114 and may observe pixel data P1 in region 116. Region 116 overlaps inactive display structure structures 46I of display structures 46, so the presence of pixel data P1' in region 116 causes viewer 48 to observe a display that is entirely filled with active pixel data and has no inactive border.

Figure 8:
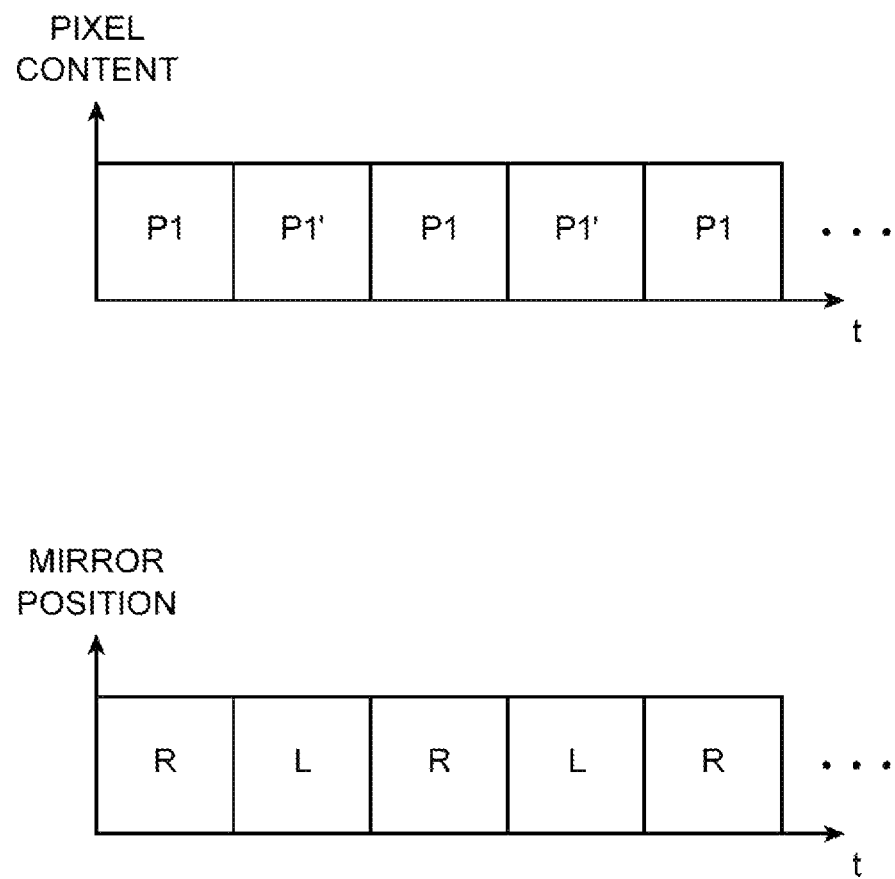
FIG. 8 is a set of graphs showing how pixel content may be modulated and mirror position synchronously adjusted to distribute light from pixels in the edge of a display to minimize display borders in accordance with an embodiment of the present invention.

The graphs of FIG. 8 illustrate how control circuitry 29 may synchronize the display of pixel content on display pixels 86 with the control of mirror position for electromechanical mirror 100 to produce a borderless display of the type shown in FIG. 7. As shown in the upper trace of FIG. 8, control circuitry 29 use path 110 to provide display pixels 86 such as peripheral display pixel P1/P1' of FIG. 7 with pixel data P1 and P1' in alternation (e.g., so that pixel data is displayed at twice the data rate of the pixel data in the center of display 14). In synchronization with the alternation of pixel data P1 and P1', control circuitry 29 adjusts electromechanical mirror structures 100 so that mirror 104 is alternately placed in position L (see ray L of FIG. 7) or position R (see ray R in FIG. 7). Mirror structures 100 will therefore distribute pixel data across an area that is sufficiently large that inactive area 46I is covered with active pixel data (pixel data P1' in this example).

To ensure that the pixel data that is displayed over inactive region 46I is sufficiently bright, display structures 46 can be configured so that peripheral display pixels produce more light than center pixels. For example, in the configuration of FIG. 7, central display pixels 86 may display pixel data P2, P3, . . . at an intensity of I/pixel, whereas edge pixel structures 86 may display pixel data P1/P1' at an intensity of 2I/pixel. Because each pixel along the edge is illuminated for half of the time that each pixel in the center is illuminated, the resulting image on display 14 will have uniform pixel intensities. Pixel brightness can be adjusted by locally adjusting the type and density of surface pits and/or bumps used on light guide plate 78 (e.g., so that more backlight is produced under peripheral pixels than central display pixels 86).

Figure 9:
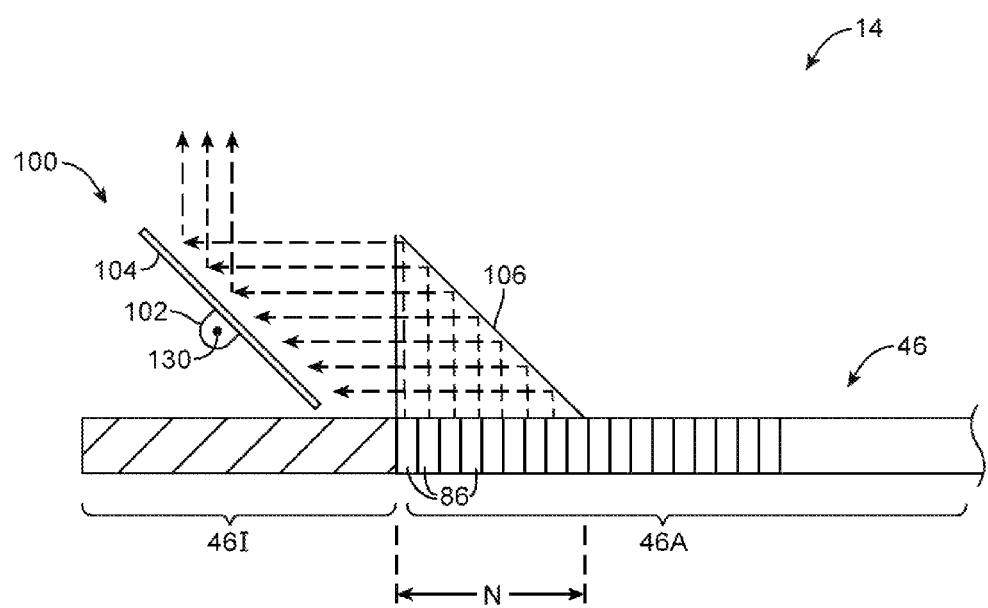
FIG. 9 is a cross-sectional side view of an illustrative electronic device with an electromechanical mirror to distribute light from multiple pixels in the edge of a display in parallel to minimize display borders in accordance with an embodiment of the present invention.

If desired, reflector 106 and electromechanical mirror structures 100 may be configured to reflect pixel data from multiple edge pixels at the same time. As shown in FIG. 9, electromechanical mirror structures 100 may, for example, use positioner 102 to adjust the position of mirror 104 so as to distribute light from a strip of display pixels that is N pixels wide. In adjusting mirror structures 100, positioner 102 controls the rotational orientation of mirror 104 about rotational axis 130 (i.e., mirror 102 is rotated back and forth to distribute pixel light so as to overlap the pixel content with inactive area 46I, as described in connection with FIG. 7). The value of N may be 2-10, 2-50, 2-100, less than 50, less than 30, less than 20, 1 or more, more than 5, 10 or more, or other suitable value.

Figure 10:
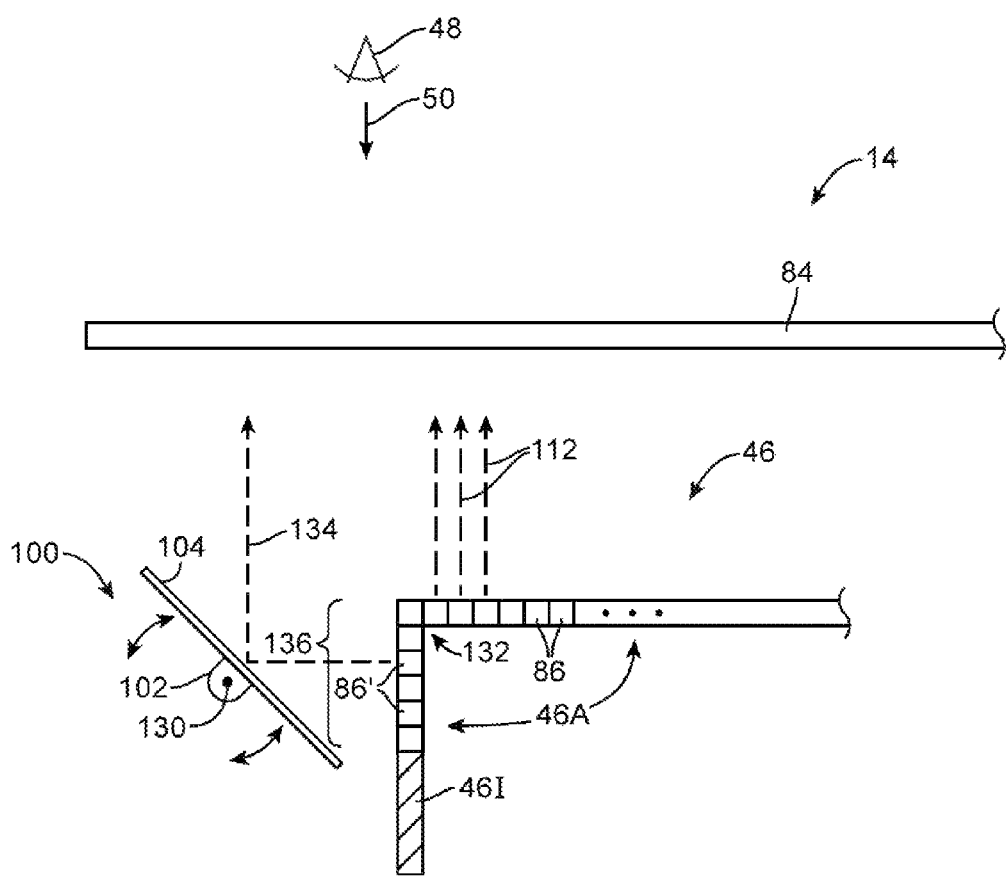
FIG. 10 is a cross-sectional side view of an illustrative display with a bent edge portion and an electromechanical mirror to distribute light from multiple pixels in the bent edge portion along the edge of a display to minimize display borders in accordance with an embodiment of the present invention.

FIG. 10 shows how display structures 46 may have a bend such as bend 132. One or more pixels such as pixels 86' in side region 136 may be controlled to produce pixel data in synchronization with the movement of electromechanical mirror structures 100. This allows electromechanical mirror structures 100 to distribute edge light such as light 134 over the border portion of display 14, so that viewer 48 perceives display 14 to be borderless. Examples of display structures 46 that may be configured to form a bend include flexible display structures such as organic light-emitting diode display structures formed on a flexible substrate such as a flexible polymer sheet, flexible liquid crystal display structures, flexible electrowetting pixels, an array of flexible electrophoretic display pixels, etc.

Figure 11:
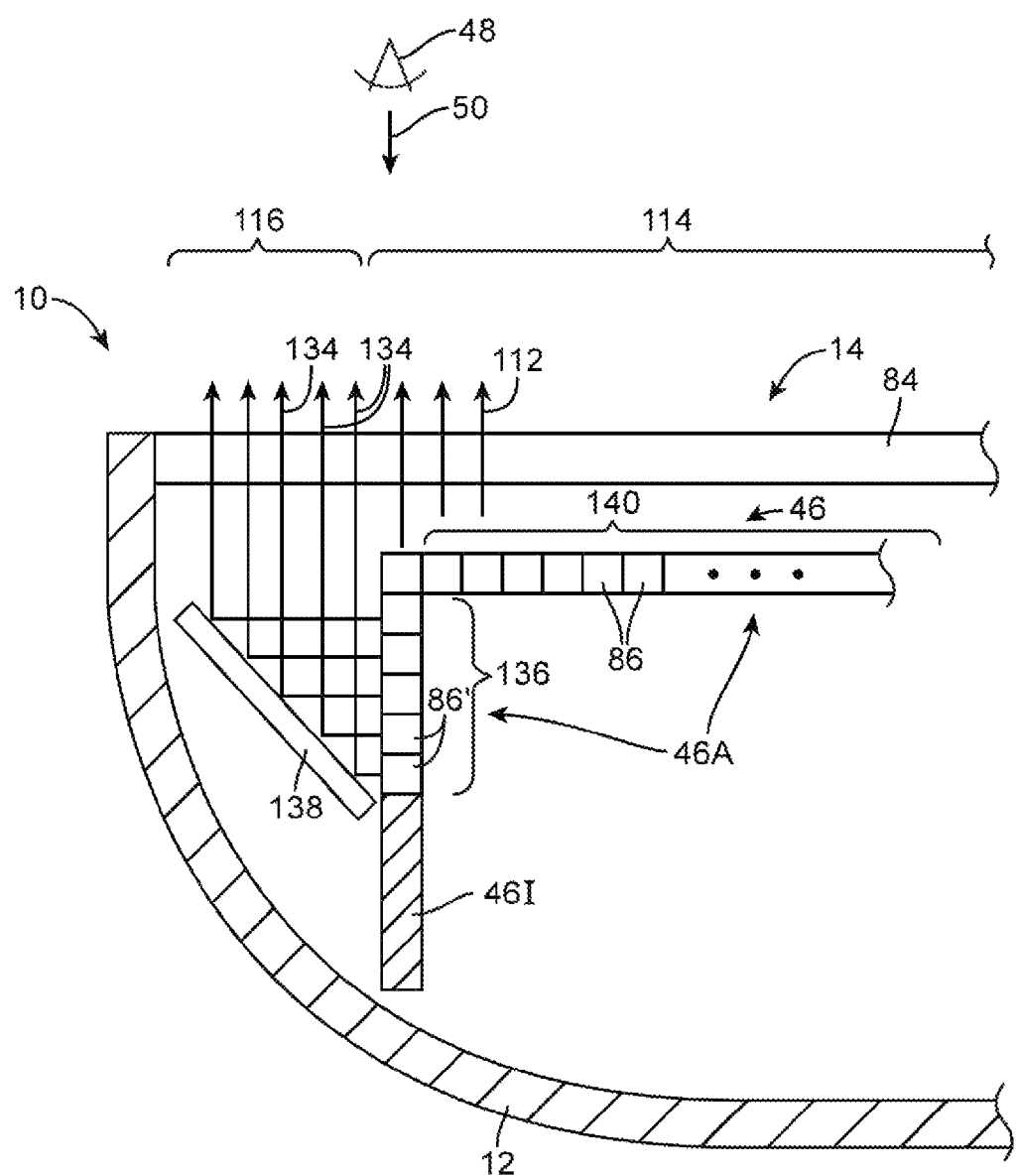
FIG. 11 is a cross-sectional side view of an illustrative display with a bent edge portion and a stationary mirror to distribute light from multiple pixels in the bent edge portion along the edge of a display to minimize display borders in accordance with an embodiment of the present invention.

FIG. 11 is a cross-sectional side view of display 14 in device 10 showing how device 10 may be provided with a fixed reflector to minimize inactive display border width. In the FIG. 11 example, display structures 46 include a bent peripheral portion such as portion 136 and a planar central region 140. Bent portion 136 may contain active display pixels 86' that produce display light 134. Reflector 138 may be a mirror or prism that is configured to reflect light 134 from pixels 86' upwards into active peripheral edge region 116. Pixels 86 in central portion 140 lie in a plane parallel to display cover layer 84 and produce light 112 that is visible in active central display region 114. When using reflector 138 to reflect pixel light 134 upwards into edge region 116, edge region 116 will be filled with active image content in addition to central region 114, thereby increasing the apparent size of display 14 and eliminating or at least reducing visible inactive border portions of display 14 that would otherwise be visible to a viewer such as viewer 48 viewing display 14 in direction 50.

In the illustrative configuration of FIG. 7, display pixel light from edge pixels such as edge pixel P1/P1' was distributed using a 1:2 distribution ratio (i.e., light from each active edge pixel in structures 46 was fanned out to cover two corresponding pixels in region 116). If desired, other distribution ratios may be used in distributing edge light in display 14. As an example, a fan-out ratio of 1:3 or 1:4 may be used.

Figure 12:
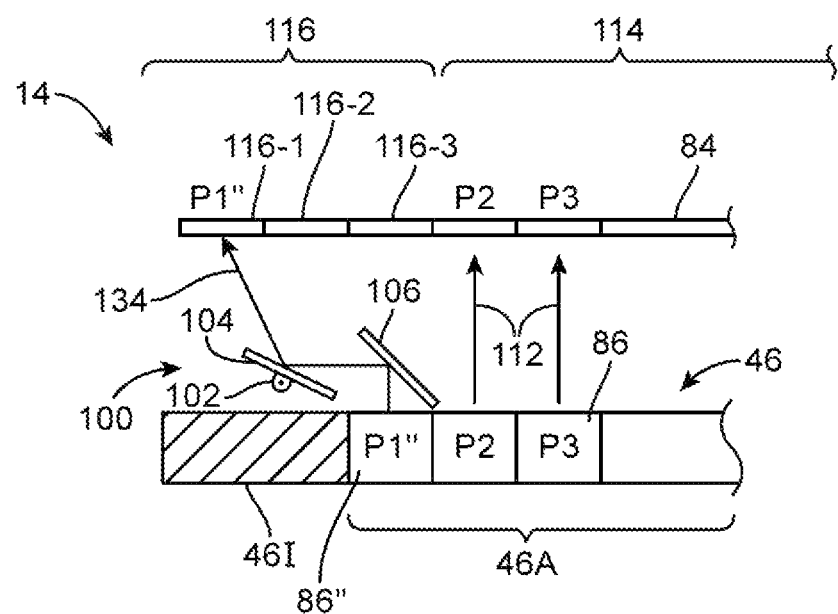
FIG. 12 is a cross-sectional side view of an illustrative display with an electromechanical mirror in a first of three positions during the process of distributing light along the edge of a display to minimize display borders in accordance with an embodiment of the present invention.
Figure 13:
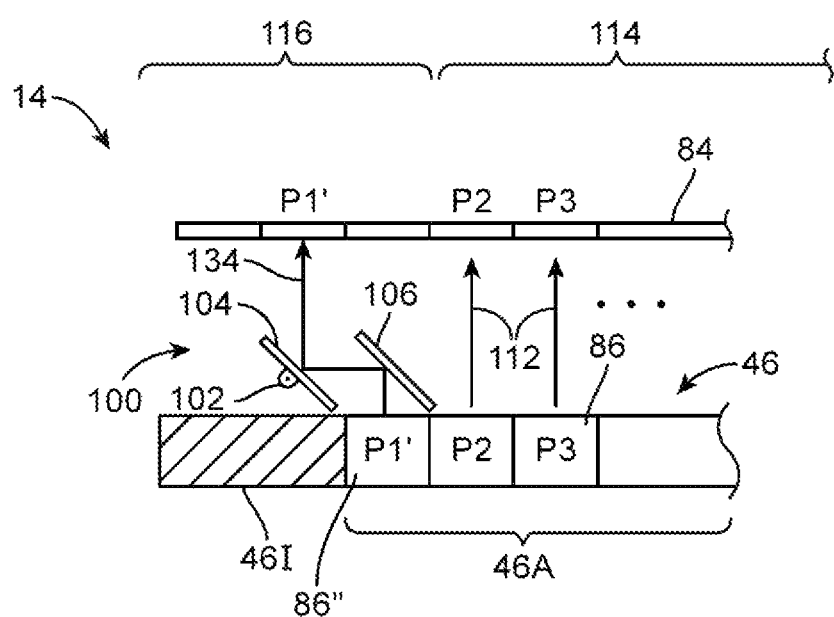
FIG. 13 is a cross-sectional side view of the illustrative display of FIG. 12 in which the electromechanical mirror is in a second of three positions during the process of distributing light along the edge of a display to minimize display borders in accordance with an embodiment of the present invention.
Figure 14:
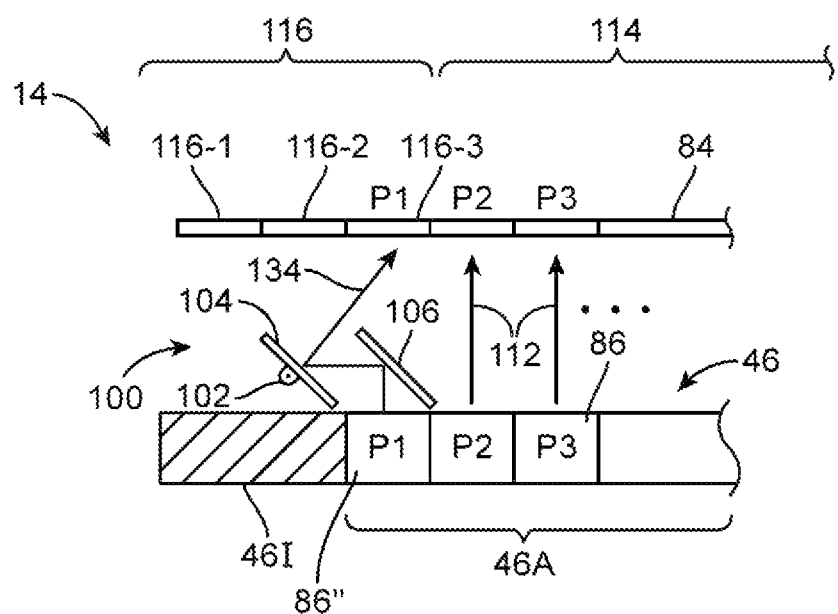
FIG. 14 is a cross-sectional side view of the illustrative display of FIG. 12 in which the electromechanical mirror is in a third of three positions during the process of distributing light along the edge of a display to minimize display borders in accordance with an embodiment of the present invention.

Consider, as an example, the display configuration of FIGS. 12, 13, and 14, which uses a 1:3 edge light distribution ratio. As shown in FIG. 12, peripheral pixel 86" may produce light 134 that reflects off of electromechanical mirror structures 100. Mirror structures 100 may be adjusted by control circuitry 29 to reflect light 134 into edge pixel location 116-1 (as shown in FIG. 12), edge pixel location 116-2 (as shown in FIG. 13), or edge pixel location 116-3 (as shown in FIG. 14).

When reflecting light 134 into location 116-1, display pixel 86" may be controlled by control circuitry 29 to display pixel data P1", as shown in FIG. 12. When reflecting light 134 into location 116-2, display pixel 86" may be controlled by control circuitry 29 to display pixel data P1', as shown in FIG. 13. FIG. 14 shows how control circuitry 29 may direct display pixel 86" to display pixel data P1 when electromechanical mirror structures 100 are adjusted to reflect light 134 into location 116-3.

To compensate for the light intensity reduction that is experienced by pixels 116-1, 116-2, and 116-3 (each of which receives only one third of light 134 from pixel 86" when averaged over time), pixel 86" can be configured to emit light 134 with an intensity that is proportionally greater than the intensity with which light 112 is emitted by pixels 86. In particular, pixels such as pixel 86" from which light is distributed across edge portion 116 in display 14 may be configured to be three times brighter than pixels such as pixels 86. In displays with different fan-out ratios, the brightness of edge pixels such as pixel 86" can be adjusted accordingly. Light from multiple edge pixels such as pixel may be redistributed in parallel using a mirror configuration of the type shown in FIG. 9.

Figure 15:
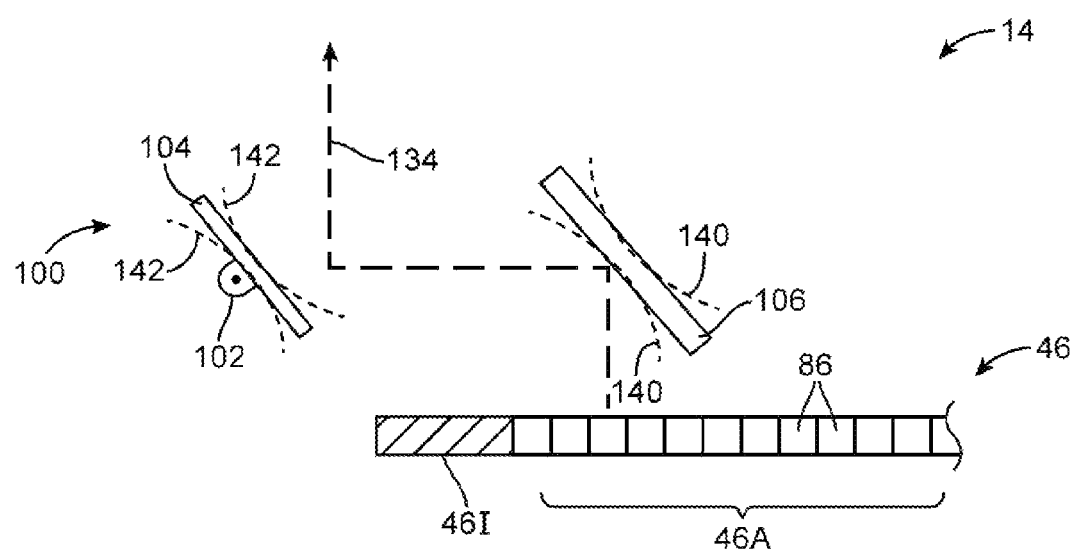
FIG. 15 is a cross-sectional side view of an illustrative display with an electromechanical mirror and a stationary mirror of the type that may be provided with optional non-planar surfaces for use in distributing light from pixels along the edge of a display to minimize display borders in accordance with an embodiment of the present invention.

Reflective structures such as reflector 106 and/or reflector 104 in electromechanical mirror 100 may be provided with non-planar surfaces. As shown in FIG. 15, for example, reflector 106 may have non-planar surface shapes such as curved surface shapes 140 and/or reflector 104 may have non-planar surface shapes such as curved surface shapes 142. Lenses and other optical structures may also be interposed in the path of light 134 to help direct light 134 along the edge of display 14.

Figure 16:
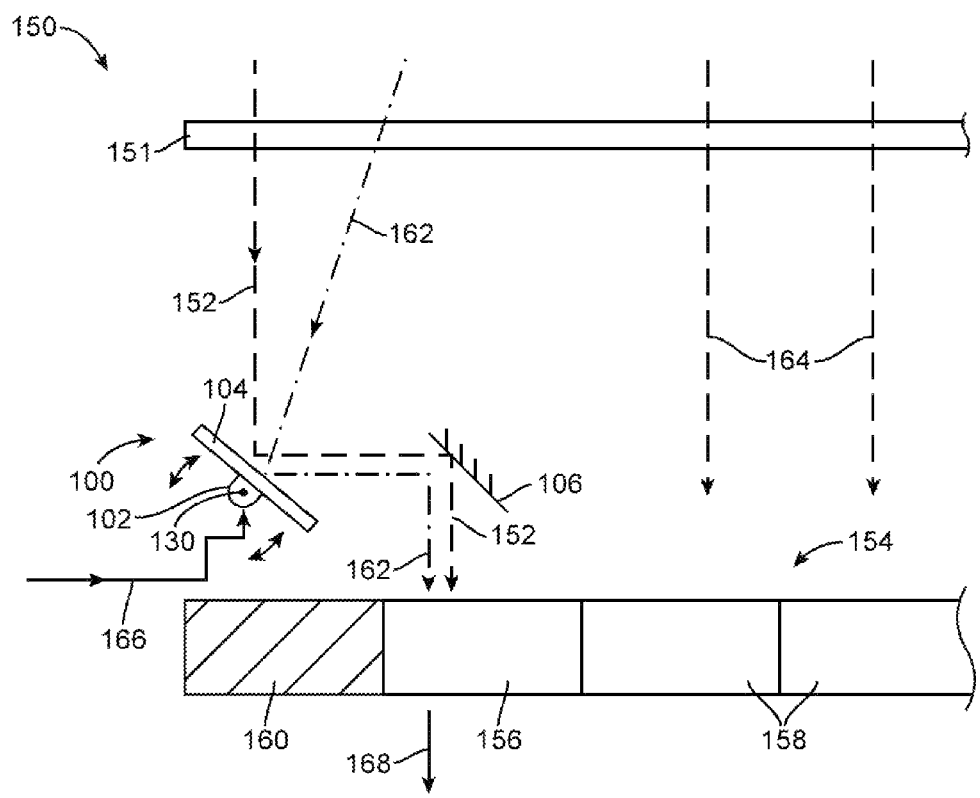
FIG. 16 is a cross-sectional side view of an illustrative image sensor system having an electromechanical mirror for enlarging the effective lateral dimensions of a digital image sensor in accordance with an embodiment of the present invention.

If desired, electromechanical mirror structures 100 may be used to direct light into an image sensor. This type of arrangement is shown in FIG. 16. As shown in FIG. 16, imaging system 150 may have optical structures 151 such as one or more lenses for gathering and focusing image light and a digital image sensor such as digital image sensor 154 that detects the focused image light. Image sensor 154 may be formed from a semiconductor substrate such as a silicon substrate (i.e., image sensor 154 may be a silicon digital imaging integrated circuit). Image sensor 154 may have central image sensor pixels such as pixels 158 that directly receive image light from an external object such as light 164. Image sensor 154 may also include peripheral image sensor pixels such as pixel 156 of FIG. 16 that receive incoming light from an external object that has reflected off of reflectors such as mirror 104 and mirror 106.

Image sensor 154 may have an inactive border region such as border region 160. Border region 160 may have a shape of a rectangular ring that runs around the peripheral edge of image sensor 154. Electromechanical mirror structures 100 may be adjusted in real time by control circuitry 29 via control path 166 while control circuitry 29 is provided with digital image data from image sensor 154 via digital data path 168. Mirror structures 100 may run along one or more, two or more, three or more, or four edges of image sensor 154.

During the acquisition of digital data using sensor 154, control circuitry 166 can adjust the position of mirror 104 in electromechanical mirror structures 100. Edge pixels such as edge pixel 156 may gather light such as light 152 when mirror 104 is in a first position and may gather light such as light 162 from another direction when mirror 104 is in a second position that is different from the first position. Because mirror structures 100 overlap inactive image sensor structures 160, the use of mirror structures 100 to deflect light into pixel 156 helps to expand the effective size of digital image sensor 154 (e.g., to effectively produce a digital image sensor that has a minimal inactive border region or has no inactive border region). If desired, mirror 100 may be used to deflect light for multiple image pixels in parallel. The configuration of FIG. 16 in which mirror 100 is being used to reflect light onto edge pixel structures with a one-pixel width is merely illustrative.

The foregoing is merely illustrative of the principles of this invention and various modifications can be made by those skilled in the art without departing from the scope and spirit of the invention.

What is claimed is:

1. A display for displaying content with an apparent size to a user, the display comprising:
   active display structures having a central region of display pixels and a peripheral edge region of display pixels;
   adjustable reflecting structures that reflect light from the display pixels in the peripheral edge region to make the apparent size of the display larger than the area of the active display structures, wherein the adjustable reflecting structures comprise a reflector and a positioner that rotates the reflector; and
   control circuitry configured to control the active display structures and the adjustable reflecting structures.

2. The display defined in claim 1 wherein the active display structures include an array of display pixels with a rectangular periphery and wherein the adjustable reflecting structures are located along at least part of the rectangular periphery.

3. The display defined in claim 2 wherein the adjustable reflecting structures comprise electromechanical mirror structures.

4. The display defined in claim 3 further comprising a stationary reflector configured to reflect the light to the adjustable reflecting structures from the display pixels in the peripheral edge region.

5. The display defined in claim 4 wherein the stationary reflector comprises a mirror.

6. The display defined in claim 5 wherein the mirror has a non-planar surface.

7. The display defined in claim 4 wherein the stationary reflector comprises a prism.

8. The display defined in claim 3 wherein the reflector comprises a mirror with a non-planar surface.

9. The display defined in claim 1 wherein the peripheral edge region of display pixels has a display pixel width of at least two display pixels.

10. A display, comprising:
    display structures having a first set of active display pixels and a second set of active display pixels; and
    adjustable reflector structures that reflect light from the second set of active display pixels without reflecting light from the first set of display pixels to reduce visible inactive display borders, wherein the adjustable reflector structures comprise a reflector and a positioner that rotates the reflector.

11. The display defined in claim 10 wherein the adjustable reflector structures comprise a stationary reflector.

12. The display defined in claim 10 wherein the second set of active display pixels displays pixels in synchronization with movement of the reflector by the positioner.

13. The display defined in claim 10 wherein the first set of active display pixels comprises an array of display pixels lying in a plane and wherein the second set of active display pixels includes at least some pixels on a bent edge portion of the display pixels that lies out of the plane.

14. The display defined in claim 10 wherein the display structures comprise organic-light-emitting diode display structures with a bent edge on which the second set of active display pixels is formed.

15. The display defined in claim 10 wherein the display structures include a display pixel array, wherein the first set of display pixels forms a central portion of the display pixels in the display pixel array, wherein the second set of display pixels forms peripheral display pixels that surround the central portion of the display, and wherein the reflector comprises an electromechanical mirror.

16. The display defined in claim 1, wherein the control circuitry is configured to direct at least one pixel in the peripheral edge region of the display pixels to alternately display first pixel data and second pixel data.

17. A display for displaying content with an apparent size to a user, the display comprising:
- active display structures having a central region of display pixels and a peripheral edge region of display pixels;
- adjustable reflecting structures that reflect light from the display pixels in the peripheral edge region to make the apparent size of the display larger than the area of the active display structures, wherein the adjustable reflecting structures comprise a reflector and a positioner that rotates the reflector; and
- control circuitry configured to control the active display structures and the adjustable reflecting structures, wherein the control circuitry is configured to direct at least one pixel in the peripheral edge region of the display pixels to alternately display first pixel data and second pixel data, wherein the control circuitry is configured to alternately adjust the adjustable reflecting structures between a first position and a second position that is different than the first position, wherein the first pixel data from the at least one pixel is reflected to a first location when the adjustable reflecting structures are in the first position, and wherein the second pixel data from the at least one pixel is reflected to a second location that is different than the first location when the adjustable reflecting structures are in the second position.

* * * * *